US012778183B2

(12) United States Patent
Franceschi et al.

(10) Patent No.: US 12,778,183 B2
(45) Date of Patent: Nov. 3, 2026

(54) METHOD FOR EVALUATING AN AEROSOL-GENERATING ARTICLE WITH A SUSCEPTOR ELEMENT FOR MANUFACTURING DEFECTS

(71) Applicant: PHILIP MORRIS PRODUCTS S.A., Neuchatel (CH)

(72) Inventors: Matteo Franceschi, Casalecchio di Reno (IT); Filippo Battisti, Modena (IT); Mauro Calanca, Castello d'Argile (IT)

(73) Assignee: Philip Morris Products S.A., Neuchatel (CH)

( * ) Notice: Subject to any disclaimer, the term of this patent is extended or adjusted under 35 U.S.C. 154(b) by 147 days.

(21) Appl. No.: 18/862,707

(22) PCT Filed: May 8, 2023

(86) PCT No.: PCT/EP2023/062120
§ 371 (c)(1),
(2) Date: Nov. 4, 2024

(87) PCT Pub. No.: WO2023/222429
PCT Pub. Date: Nov. 23, 2023

(65) Prior Publication Data

US 2025/0344748 A1 Nov. 13, 2025

(30) Foreign Application Priority Data

May 16, 2022 (EP) .................................... 22173547

(51) Int. Cl.
*A24C 5/345* (2006.01)
*A24F 40/465* (2020.01)
(Continued)

(52) U.S. Cl.
CPC ............ *A24C 5/345* (2013.01); *A24F 40/465* (2020.01); *A24F 40/70* (2020.01);
(Continued)

(58) Field of Classification Search
None
See application file for complete search history.

(56) References Cited

U.S. PATENT DOCUMENTS

2013/0002853 A1 1/2013 Okuyama
2015/0374028 A1* 12/2015 Gindrat ................ A24C 5/3412 700/98
2022/0015413 A1 1/2022 Black

FOREIGN PATENT DOCUMENTS

WO WO-2020109203 A1 * 6/2020 ............... H05B 3/22
WO WO 2021/121790 6/2021
WO WO 2022/008879 1/2022

OTHER PUBLICATIONS

PCT Search Report and Written Opinion for PCT/EP2023/062120 dated Jul. 10, 2023 (18 pages).
(Continued)

*Primary Examiner* — David Ometz
(74) *Attorney, Agent, or Firm* — Mueting Raasch Group

(57) ABSTRACT

The invention relates to a method for evaluating an aerosol-generating article with a susceptor element for manufacturing defects. The method comprises providing an aerosol-generating article with a substrate section, the substrate section comprising aerosol-forming substrate (24) and the susceptor element (26). The method furthermore comprises the method step of providing an intersection through the substrate section and the susceptor element. Another step includes evaluating the intersection for manufacturing defects by determining one or more of: positioning of the susceptor element in the substrate section, length of the cross section of the susceptor element, and shape of the cross
(Continued)

section of the susceptor element. Therefor, in an embodiment a visual image of the intersection is divided into a plurality of segments (34), thereby creating an approximated circumference (22) of the cross-section with the susceptor element.

19 Claims, 7 Drawing Sheets

(51) Int. Cl.

| | |
|---|---|
| ***A24F 40/70*** | (2020.01) |
| ***G01N 21/88*** | (2006.01) |
| ***G01N 21/952*** | (2006.01) |
| ***G06T 7/00*** | (2017.01) |

(52) U.S. Cl.
CPC ....... *G01N 21/8851* (2013.01); *G01N 21/952* (2013.01); *G06T 7/001* (2013.01); *G06T 2207/30108* (2013.01)

(56) References Cited

OTHER PUBLICATIONS

International Preliminary Report on Patentability for PCT/EP2023/062120 dated Mar. 14, 2024 (17 pages).

* cited by examiner

METHOD FOR EVALUATING AN AEROSOL-GENERATING ARTICLE WITH A SUSCEPTOR ELEMENT FOR MANUFACTURING DEFECTS

This application is a U.S. National Stage Application of International Application No. PCT/EP2023/062120 filed May 8, 2023, which was published in English on Nov. 23, 2023, as International Publication No. WO 2023/222429 A1. International Application No. PCT/EP2023/06120 claims priority to European Application No. 22173547.5 filed May 16, 2022.

The present invention relates to a method for evaluating an aerosol-generating article with a susceptor element for manufacturing defects.

Aerosol-generating articles, in particular heat-not-burn articles comprise a substrate section comprising aerosol-forming substrate and additionally frequently a susceptor element. The susceptor element may be configured to heat the aerosol-forming substrate via inductive heating. The positioning of the susceptor element within the aerosol-forming substrate of the substrate section and the shape of the susceptor element can affect the ability of the susceptor element to heat the aerosol-forming substrate. Long rods containing a plurality of aerosol-generating articles with continuous susceptor bands can be cut by a cutting device, such as a rotating knife in order to produce individual single aerosol-generating articles including a susceptor element. The cutting process may dislocate and deform any susceptor element located in the substrate section of an aerosol-generating article. Additionally, the positioning of the susceptor band in relation to the adjacent aerosol-forming substrate when assembling the aerosol-forming articles may be offset. This may result in a dislocation of the susceptor element within the substrate section. This may negatively affect the ability of the susceptor element to sufficiently heat the aerosol-forming substrate. The manufacturing process for the aerosol-generating article and the step of cutting the long rods may be a high-speed process which does not allow an in-depth time-consuming evaluation of the correct positioning and shape of the aerosol-generating article.

It would be desirable to provide a method for evaluating an aerosol-generating article with a susceptor element for manufacturing defects, which is more accurate.

According to an embodiment of the present invention there is provided a method for evaluating an aerosol-generating article with a susceptor element for manufacturing defects. The method may comprise providing an aerosol-generating article with a substrate section, wherein the substrate section comprises aerosol-forming substrate and a susceptor element. The method may comprise providing an intersection through the substrate section and the susceptor element. Furthermore, the intersection may be evaluated for manufacturing defects by determining one or more of:

positioning of the susceptor element in the substrate section, length of the cross section of the susceptor element, and shape of the cross section of the susceptor element.

In another embodiment of the present invention there is provided a method for evaluating an aerosol-generating article with a susceptor element for manufacturing defects. The method comprises the step of providing an aerosol-generating article with a substrate section. The substrate section comprises aerosol-forming substrate and a susceptor element. The method comprises the step of providing an intersection through the substrate section and the susceptor element. The intersection is evaluated for manufacturing defects by determining one or more of:

positioning of the susceptor element in the substrate section, length of the cross section of the susceptor element, and shape of the cross section of the susceptor element.

Such a method may allow to detect any manufacturing defects related to one or more of: the positioning of the susceptor element in the substrate section, the length or the shape of the cross section of the susceptor element.

A visual image of intersection may be recorded and this image may be evaluated for the manufacturing defects. In particular, a digital visual image of the intersection may be recorded.

This may allow processing of an image in a more reliable way. A digital visual image may allow to evaluate the digital image via digital image processing employing an algorithm.

A camera system may be employed for recording an image of the intersection. The camera system may be a digital camera system allowing to record digital images of the intersection.

Example of camera systems employed in order to record the digital image of the intersection may be a Basler acA1300-75gc camera system, a CA-HX048M camera system, or a Teledyne Dalsa Genie Nano camera system.

The camera system may include an illumination source. The illumination source may be configured to illuminate the intersection through the substrate section and the susceptor element. This may improve the quality of the image, in particular the digital image recorded by the camera system. The illumination source may comprise a lamp including for example an LED.

Brightness changes may be detected in the segments, thereby creating datapoints for the circumference of the cross section of the susceptor element. The datapoints may be employed to reconstruct the cross section of the susceptor element. Preferably, the cross section of the susceptor element may be reconstructed by fitting a cross sectional shape through the datapoints of the segments.

The image, in particular the digital image may be processed via digital imaging processing. The digital image may be processed via image approximation. Image approximation may involve processing the image via an approximation algorithm which provides a digital simplification of the recorded digital image of the intersection for accelerated processing.

Processing via image approximation may comprise dividing the digital image into a plurality of sections. Each segment of the image may be processed separately via digital processing. The digital image may for example be divided into 20 to 50 segments. In particular, the image may be divided into 36 segments for image processing. This may ease and accelerate processing of the image via image approximation.

Processing via image approximation may comprise edge detection. Edge detection may involve detecting changes in the intensity, in particular the brightness intensity within a segment in the recorded image. Analysing the brightness intensity of the image may comprise detecting large changes in the dark-to-bright intensity when scanning a segment of the digital image. Large changes in intensity of dark to bright may indicate a boundary between an object and the background. The changes in the intensity may be detected within one segment of the image when scanning from the outer parts of the digital image towards the centre of the image. Detecting such a change in the intensity may provide one data point for each segment.

Data points may furthermore be obtained via blob analysis tools. Blob detection may involve the detection of image points in an image that are roughly similar to each other concerning for example the colour or the brightness of image points. This may ease the analyzation of the approximated circumference of one or both of the circumference of the aerosol-generating article and the circumference of the cross-section of the susceptor element.

A plurality of data points from the plurality of segments can be fitted to provide the circumference of the aerosol-generating article via for example the least square method. This might indicate the boundary of the outer circumference of the aerosol-generating article. Such segmented edge detection may allow quick imaging processing and approximated detection of the circumference of the article. In particular, edge detection may allow approximated detecting of the boundaries of the circumference of the aerosol-generating article and the outside of the aerosol-generating article. The circumference of the article may be defined by tipping paper wrapped around the article.

Likewise, the circumference of the cross section of the susceptor element within the intersection of the article may be determined in relation to the surrounding of the susceptor element in the aerosol-generating article. In particular, the approximated circumference of the cross-section of the susceptor element in relation to the aerosol-forming substrate surrounding susceptor element in the aerosol-generating article may be determined.

Image approximation via edge detection may allow detection of an approximated circumference of the article and an approximated circumference of the cross section of the susceptor element. An approximated positioning of the approximated circumference of the cross section of the susceptor element within the approximated circumference of the article may be determined. The approximated positioning may be done by measuring a distance between the approximated circumference of the cross section of the susceptor element and the approximated circumference of the cross-section of the aerosol-generating article.

Likewise, an approximated circumference of the cross-section of the susceptor element may also provide a shape of the cross-section of the susceptor element within the intersection of the article. Similarly, an approximated length of the approximated circumference of the cross-section of the susceptor may be determined. The approximated length may be the longest dimension of the approximated circumference of the cross-section of the susceptor element. For example, if the approximated circumference has a rectangular shape, the longest dimension may be the length of the rectangular circumference.

The approximated circumference in the substrate section may be determined and compared to a reference range, thereby obtaining a first evaluation result.

This may enable a comparison between the reference range indicating an acceptable range for the cross-section of the susceptor element within the article with the actually determined approximated cross-section of the susceptor element.

The reference range may comprise one or more of: a reference positioning of the cross section of the susceptor element within the aerosol-generating article, a reference shape of the cross section of the susceptor element, and a reference length of the cross section of the susceptor element.

This may allow comparing one or more of the positioning, the shape or the length of the approximated circumference of the susceptor element with the respective reference ranges.

The method for evaluating the aerosol-generating article for manufacturing defects may comprise employing the reference positioning of the cross section of the susceptor element within the aerosol-generating article. This reference positioning may be compared to the approximated positioning of the susceptor element, thereby obtaining a first positioning evaluation result.

The reference positioning may indicate an acceptable area within the intersection of the aerosol-generating article which could be occupied by the cross-section of the susceptor element. The cross-section of the susceptor element may comprise an elongated shape. The cross-section of the susceptor element may comprise a rectangular shape. The reference positioning may define an area around the elongated shape or the rectangular shape of the cross-section of the susceptor element as an acceptable area which could be occupied by cross-section of the susceptor element. For example, the reference positioning may define an acceptable rectangular area around the rectangular-shaped cross-section of the susceptor element. Likewise, the reference positioning may define an acceptable elongated area around an elongated cross-section of the susceptor element.

For example, for an aerosol generating article with an intersection having a diameter between 7.0 and 7.2 millimeter an acceptable area of a rectangular-shaped cross-section of a susceptor element may be within a rectangular shaped area having a length of around 6 millimeters and a width of around 6 millimeters. The dimensions of the actual cross-section of the susceptor element would have a length of around 3.5 to 4.5 millimeters and width of around 0.04 to 0.08 millimeters.

The acceptable area where the cross-section of the susceptor element could be located, could also be defined as every area within the intersection of the article which is at least a certain distance spaced apart from the outer circumference of the article. For example, for tobacco rods having a diameter between 7.0 and 7.2 millimeters the susceptor element could be located within every area of the intersection of the aerosol-generating article which is at least 1 millimeter spaced apart from the outer circumference of the article.

The method for evaluating the aerosol-generating article for manufacturing defects may comprise employing the reference shape of the cross section of the susceptor element. This reference shape of the cross section of the susceptor element may be compared with the approximated circumference of the cross section of the susceptor element, thereby obtaining a first shape evaluation result.

The reference shape of the cross-section of the susceptor element may define a maximal acceptable bending of the cross-section of the susceptor element. The maximal acceptable bending of the cross-section of the susceptor element may define an area which could be occupied by the shape of the cross-section of the susceptor element. For a susceptor element having a cross-section of a rectangular shape with a length and a width of around 4 millimeter to 0.6 millimeter the acceptable bending may be 0.9 millimeter at most. This might define a reference area for the shape of a width of up to 0.9 millimeter around the susceptor element.

The method for evaluating the aerosol-generating article for manufacturing defects may comprise employing the reference length of the cross-section of the susceptor element. This reference length of the cross-section of the susceptor element may be compared with the approximated length of the cross-section of the susceptor element, thereby obtaining a first length evaluation result.

An acceptable variation in the length of the cross-section of the susceptor element may be up to 20 percent of the length, preferably up to 10 percent of the length of the susceptor.

The first evaluation result may be obtained during manufacturing of the aerosol-generating article. Preferably, a production device may be used for manufacturing the aerosol-generating article and said production device may be employed for obtaining the first evaluation result.

Obtaining the first evaluation result via approximation procedures may provide a quick and easy to calculate way of evaluating manufacturing defects related to one or more of the positioning of the substrate section in the aerosol-generating article, the shape of the susceptor element, and the length of the susceptor element.

For example, a HAUNI CLT crimping machine, an ITM multi-segment filter combiner or a GD cigarette making machine could be used for manufacturing the aerosol-generating articles. These production devices all have operating systems for operating the machines during the manufacturing process. Performing the above method steps for obtaining the first evaluation result can be done quickly owing to the approximation procedure used for digital processing of the images of the intersections of the aerosol-generating articles.

This "in-line" analysis made during the manufacturing process may lead to a rough approximation of the circumference of the cross-section of the susceptor element. This can be done in particular by analysing segments of the digital image as described above. The methods for manufacturing the aerosol-generating articles are high speed processes leading to a high output of manufactured aerosol-generating articles per time interval. This high-speed process therefore does not allow a more detailed time-consuming image processing of the images of the intersection of the aerosol-generating articles produced during the manufacturing process.

The method for evaluating an aerosol-generating article with a susceptor element for manufacturing defects may also include a step of determining a refined circumference of the cross-section of the susceptor element. A visual image may comprise a plurality of image points. A circumference of the cross-section of the susceptor element may be determined by analysing at least 70%, preferably at least 90%, most preferably at least all image points of the visual image. This may create a refined circumference of the cross-section of the susceptor element in the visual image recorded during the manufacturing process.

An accuracy of the refined circumference of the cross-section of the susceptor element may be higher than an accuracy of the approximated circumference of the cross-sectional of the susceptor element determined via the approximation procedures mentioned above.

The refined circumference of the susceptor element in the substrate intersection may be compared to the reference range, thereby obtaining a second evaluation result.

The second evaluation result may be more accurate than the first evaluation result. This may be due to the fact that the second evaluation result employs the refined circumference of the susceptor element, whereas the first evaluation result uses an approximated circumference of the cross-section of the susceptor element.

The second evaluation result may be obtained by employing a computer system. The computer system may be separate from the production device for manufacturing the aerosol-generating article. The second evaluation procedure for obtaining the second evaluation result therefore also may be called "off-line" evaluation. The computer system may allow for more computational time to determine the refined circumference of the cross-section of the susceptor element in comparison to the manufacturing devices for the aerosol-generating articles which are employed to determine the approximated circumference of the cross-section of the susceptor element. Determining the refined circumference of the cross-section of the susceptor element in the intersection of the aerosol-generating article can be done with special image processing software, such as Vision Pro® QuickBuild Setup Cognex Designer.

Determining the refined circumference of the cross-sectional of the susceptor element in the visual image of the intersection of the aerosol-generating article may also comprise edge detection. Edge detection may involve detecting changes in the intensity, in particular the brightness intensity of the image points in the recorded visual image. Analysing the brightness intensity of the pixels of the image may comprise detecting large changes in the dark-to-bright intensity between adjacent image points. Large changes in intensity of dark to bright between adjacent pixels may indicate a boundary between an object and the background. Edge detection including at least 70 percent, preferably at least 90 percent, most preferably all image points of the visual image allows a more accurate determination of the refined circumference of the cross-section of the susceptor element. Likewise, edge detection including at least 70 percent, preferably at least 90 percent, most preferably all image points of the visual image may also allow a more accurate determination of the refined circumference of the cross-section of the aerosol-generating article. The circumference of the article may be defined by tipping paper wrapped around the article. Likewise, the circumference of the cross section of the susceptor element may be determined in relation to the surrounding of the susceptor element in the aerosol-generating article. In particular, the refined circumference of the cross-section of the susceptor element in relation to the aerosol-forming substrate surrounding susceptor element in the aerosol-generating article may be determined.

Edge detection may allow detection of the refined circumference of the article and the refined circumference of the cross section of the susceptor element. A refined positioning of the refined circumference of the cross section of the susceptor element within the refined circumference of the article may be determined. The refined positioning may be done by measuring a distance between the refined circumference of the cross section of the susceptor element and the refined circumference of the cross-section of the aerosol-generating article.

The refined circumference of the aerosol-generating article and the refined circumference of the cross-section of the susceptor element may be employed to determine one or more of: a refined positioning of the cross-section of the susceptor element within the aerosol-generating article, a refined shape of the cross-section of the susceptor element, and a refined length of the cross-section of the susceptor element.

The one or more of: the refined positioning of the cross-section of the susceptor element within the aerosol-generating article, the refined shape of the cross-section of the susceptor element, and the refined length of the cross-section of the susceptor element can be compared to the same reference ranges as the respective approximated parameters.

Therefore, the method for evaluating the aerosol-generating article for manufacturing defects may also comprise employing the reference positioning of the cross section of the susceptor element within the aerosol-generating article. This reference positioning may be compared to the refined positioning of the susceptor element, thereby obtaining a second positioning evaluation result.

The method for evaluating the aerosol-generating article for manufacturing defects may comprise employing the reference shape of the cross section of the susceptor element. This reference shape of the cross section of the susceptor element may be compared with the refined circumference of the cross section of the susceptor element, thereby obtaining a second shape evaluation result.

The method for evaluating the aerosol-generating article for manufacturing defects may comprise employing the reference length of the cross-section of the susceptor element. This reference length of the cross-section of the susceptor element may be compared with the refined length of the cross-section of the susceptor element, thereby obtaining a second length evaluation result.

Any aerosol-generating article would have passed any of the first evaluation results, if one or more of: the approximated positioning of the cross-section of the susceptor element within the aerosol-generating article, the approximated shape of the cross-section of the susceptor element, and the approximated length of the cross-section of the susceptor element are located fully within the respective reference ranges.

Likewise, any aerosol-generating article would have failed any of the first evaluation results, if one or more of: the approximated positioning of the cross-section of the susceptor element within the aerosol-generating article, the approximated shape of the cross-section of the susceptor element, and the approximated length of the cross-section of the susceptor element may be at least partially located outside of the respective reference ranges.

The substrate section of the aerosol-generating article including the susceptor element may be covered with wrapping paper. The first positioning evaluation result may be obtained by determining a distance between the wrapping paper and the approximated circumference of the cross-section of the susceptor element. This distance may be determined by determining the distance between the part of the approximated circumference which is closest to the wrapping paper. In particular the edges of the upper approximated circumference of the susceptor element may be the part located nearest to the wrapping paper.

Similarly, the second positioning evaluation result may be obtained by determining a distance between the wrapping paper and the refined circumference of the susceptor element. This distance may also be determined by determining the distance between the part of the refined circumference which is closest to the wrapping paper.

Determining the first positioning evaluation result and the second position evaluation result in the above-mentioned way may be particularly advantageous, if the reference positioning range is a certain minimal distance between the wrapping paper of the substrate section of the article and the cross-section of the susceptor element.

It also may be possible that an aerosol-generating article is rejected if any part of the approximated circumference deviates from the reference positioning range by more than 10 percent or if any part of the refined circumference deviates from the reference range positioning by more than 10 percent.

Aerosol-generating articles which are considered to have failed may be discarded after manufacturing.

During the production of the aerosol-generating articles the first evaluation result, in particular one or more of: the first positioning evaluation result, the first shape evaluation result, and the first length evaluation result may be continuously determined.

If aerosol-generating articles are detected having a susceptor element which fails to pass the first evaluation, the positioning of the susceptor band within the aerosol-forming substrate may be changed during the manufacturing process. This may change the positioning of the susceptor element within the aerosol-generating article and therefore may reposition the susceptor element within the acceptable reference range for positioning.

Similarly, the force or momentum of any cutting device, such as a rotating knife may be changed in order to change one or both of: the deformation of the susceptor element, and the shape of the susceptor element within the aerosol-generating article. Similarly, the length of the susceptor element within the aerosol-generating article may be changed. This may change one or more of: the shape, and the length of the susceptor element within the aerosol-generating article and therefore may reposition the susceptor element within the acceptable reference ranges for the shape and the length.

The second evaluation result may be more accurate than the first evaluation result. This may be due to the fact that the approximated circumference of the cross-section of the susceptor element determined during the first evaluation employs less data points than the determination of the refined circumference during the second evaluation. The second evaluation result therefore may be employed for correcting the first evaluation result. In particular, the second evaluation result may be used in order to confirm or disconfirm the first evaluation result. The second evaluation result may be determined at a lower time interval compared to the first evaluation result.

For example, the first evaluation may be done continuously throughout the manufacturing process for the aerosol-generating articles. The second evaluation may be done every month or every 6 months.

As used herein, the term 'aerosol-forming substrate' relates to a substrate capable of releasing one or more volatile compounds that can form an aerosol. Such volatile compounds may be released by heating the aerosol-forming substrate. An aerosol-forming substrate may conveniently be part of an aerosol-generating article or smoking article.

The aerosol-forming substrate may be a solid aerosol-forming substrate. The aerosol-forming substrate may comprise both solid and liquid components. The aerosol-forming substrate may comprise a tobacco-containing material containing volatile tobacco flavour compounds which are released from the substrate upon heating. The aerosol-forming substrate may comprise a non-tobacco material. The aerosol-forming substrate may comprise an aerosol former that facilitates the formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The aerosol-former may be propylene glycol. The aerosol former may comprise both glycerine and propylene glycol.

The susceptor element may have an elongate, flat shape. In particular, the susceptor element may comprise a band with opposing edges. The susceptor element may have a width and may have a length. The ratio of the length to the width in the individual susceptor elements may be between 1.5 to 4.5, preferably between 1.8 to 3.5, more preferably between 1.9 to 2.5. In one embodiment, the length of a susceptor element may be between 9 mm to 12 mm and the width may be between 3 mm to 6 mm, preferably the length may be between 10 to 12 mm and the width may be between 4 to 5 mm. The length of the substrate section may be between 10 to 15 mm, preferably 12 mm.

In general, the susceptor element comprises or is made of a material that is capable of generating heat, when penetrated by an alternating magnetic field. If the susceptor element is conductive, then typically eddy currents are induced by the alternating magnetic field. If the susceptor element is magnetic, then typically another effect that contributes to the heating is commonly referred to hysteresis losses. Hysteresis losses occur mainly due to the movement of the magnetic domain blocks within the material of the susceptor element, because the magnetic orientation of these will align with the magnetic induction field, which alternates. Another effect contributing to the hysteresis loss is when the magnetic domains will grow or shrink within the material of the susceptor element. Commonly all these changes in the material of the susceptor element that happen on a nano-scale or below are referred to as "hysteresis losses", because they produce heat in the material of the susceptor element. Hence, if the susceptor is both magnetic and electrically conductive, both hysteresis losses and the generation of eddy currents will contribute to the heating of the susceptor element. If the material of the susceptor element is magnetic, but not conductive, then hysteresis losses will be the only means by which the susceptor element will heat, when penetrated by an alternating magnetic field. According to the invention, the material of the susceptor element may be magnetic and electrically conductive.

The susceptor material may for example comprise a ferromagnetic material. Preferably the susceptor material may comprise a ferromagnetic alloy. More preferably the susceptor material may comprise ferritic iron, in particular a ferromagnetic steel or stainless steel.

The susceptor element comprising the susceptor material may heat the aerosol-forming substrate surrounding the susceptor element.

The step of providing an intersection through the substrate section and the susceptor element may be done by cutting a continuous rod into individual aerosol-generating articles with a cutting device. Alternatively, one single aerosol-generating article may be cut within its substrate section in order to provide the intersection. A rotating knife may be employed as a cutting device.

Features described in relation to one embodiment may equally be applied to other embodiments of the invention.

The invention will be further described, by way of example only, with reference to the accompanying drawings in which.

In the following the same elements are marked with the same reference numerals throughout all the figures.

Figure 1:
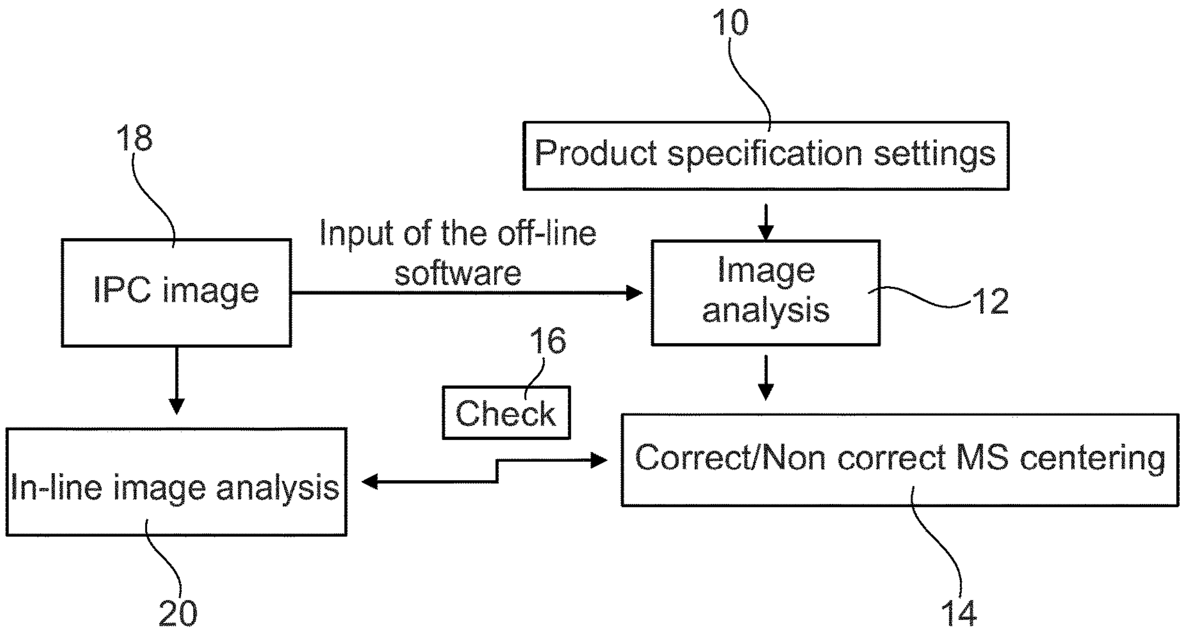
FIG. 1 shows a flow chart of one embodiment of the method of the invention for evaluating manufacturing defects.

FIG. 1 depicts a flow chart of one embodiment of the method of the invention for evaluating an aerosol-generating article with a susceptor element for manufacturing defects. The method employs reference range 10, the box titled "product specification settings". This reference range 10 includes acceptable reference ranges for one or more of the positioning, shape and the length of a cross-section of the susceptor element within an aerosol-generating article. A camera system of the manufacturing device is able to record a visual image of the intersection of the aerosol-generating article with the susceptor as shown with the box with the reference numeral 18, titled "IPC image". This camera might be a camera of the manufacturing device and might therefore be an "internal process camera (IPC)". The manufacturing device starts its own analysis of the visual image based on the operating software of the manufacturing device as shown in the box 20, titled "in-line image analysis". This "in-line image analysis" enables to check the visual image, as denoted in the box with the reference numeral 16 to evaluate whether the metal susceptor (MS) is correctly positioned within the reference range in the aerosol-generating article as shown with the box 14 titled "correct/non-correct MS centering". This results in a first evaluation result of the manufacturing device. For the first evaluation result approximation algorithms are employed in order to quickly evaluate the positioning of the susceptor element within the aerosol-generating article. Additionally, a computer system employs a more in-depth image processing procedure with the recorded visual image. This can be done by image processing procedures involving every image point of the visual image. This may provide a more refined and more accurate image processing of the visual image compared to the first evaluation result. This will provide further input into the image analysis and into the evaluation of the correct positioning of the susceptor element as shown in the flow-chart with the arrow titled "input of the off-line software".

Figure 2:
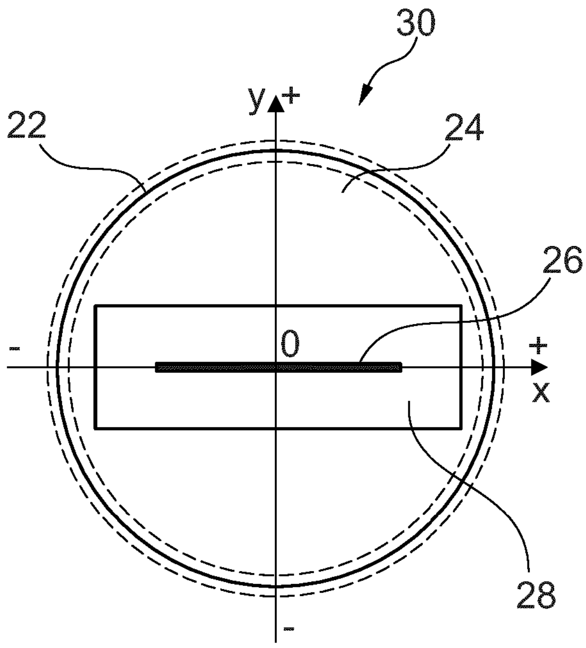
FIG. 2 depicts an intersection of an article with a susceptor element and a reference range for the positioning of the susceptor element.

FIG. 2 depicts a schematic intersection 30 of an aerosol-generating article. The intersection 30 shows the outer circumference 22 of the aerosol-generating article which may comprise wrapping paper. The wrapping paper is wrapped around aerosol-forming substrate 24. The aerosol-forming substrate 24 is located outside of an acceptable reference range for the positioning of the cross-section of the susceptor element, which is indicated by the box 28. The perfectly positioned cross-section 26 of the susceptor element is fully located within the acceptable reference range 28. The overall dimension of the cross-section of the aerosol-generating article may be a diameter of 7.05 (±0.15) millimeters. The cross-section 26 of the susceptor might have a length of 4 (±0.15) millimeters and a width of 0.06 (±0.005) millimeters. The x-coordinates and the y-coordinates are indicated within FIG. 2. The acceptable reference range indicated by the area 28 may allow positioning of the perfectly positioned cross-section of the susceptor element within an area of the x-coordinate of the perfectly positioned susceptor element ±3 millimeters and within an area of the y-coordinate of the perfectly positioned susceptor element ±1 millimeters.

Figure 3:
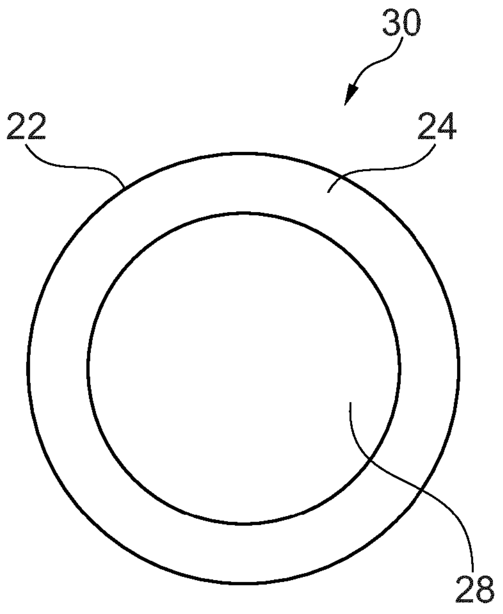
FIG. 3 shows another reference range for positioning of a cross-section of the susceptor element within the intersection of an aerosol-generating article.

FIG. 3 shows an alternative reference range for the positioning of the cross-section of the susceptor element within the intersection of an aerosol-generating article. The reference range 28 includes the complete intersection of the aerosol-generating article which is at least a certain distance spaced apart from the outer circumference 22 of the article. In the present case the reference range 28 could include the complete area of the intersection 30 of the aerosol-generating article which is at least 1 millimeter spaced apart from the outer circumference 22.

Figure 4:
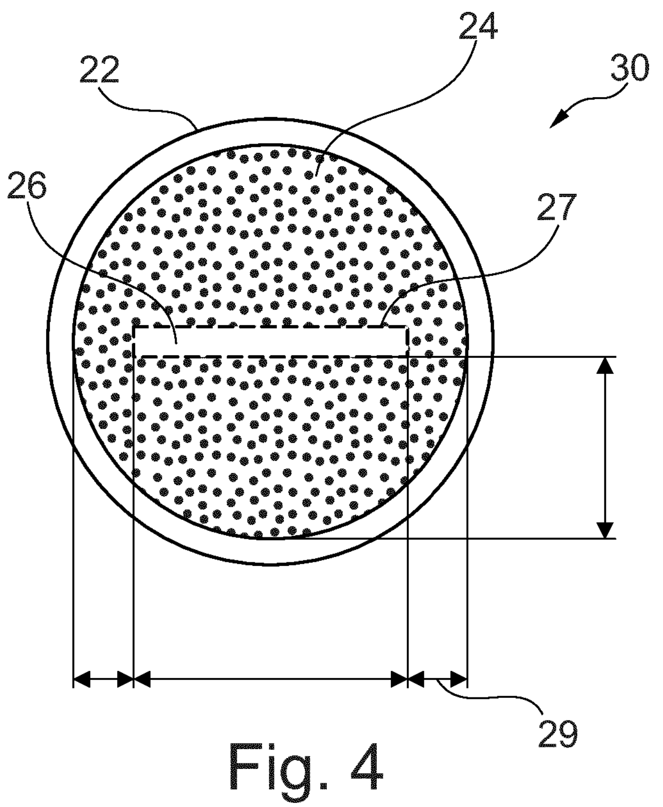
FIG. 4 shows an intersection of an aerosol-generating article with a circumference of the cross section of the susceptor element which can either be obtained via a refined procedure or via approximation as disclosed herein.

FIG. 4 shows a circumference of a cross-section of a susceptor element which is either approximated or refined as described herein. The actual cross-section of the susceptor element is denoted with the reference numeral 26 and the dashed line 27 indicates the circumference of the cross-section of the susceptor element as determined via image processing. Evaluating the positioning of the circumference 27 of the susceptor element within the intersection 30 of the aerosol-generating article may include determining a distance 29 from the edge of the circumference of the susceptor element to the outer circumference 22 of the aerosol-generating article.

Figure 5:
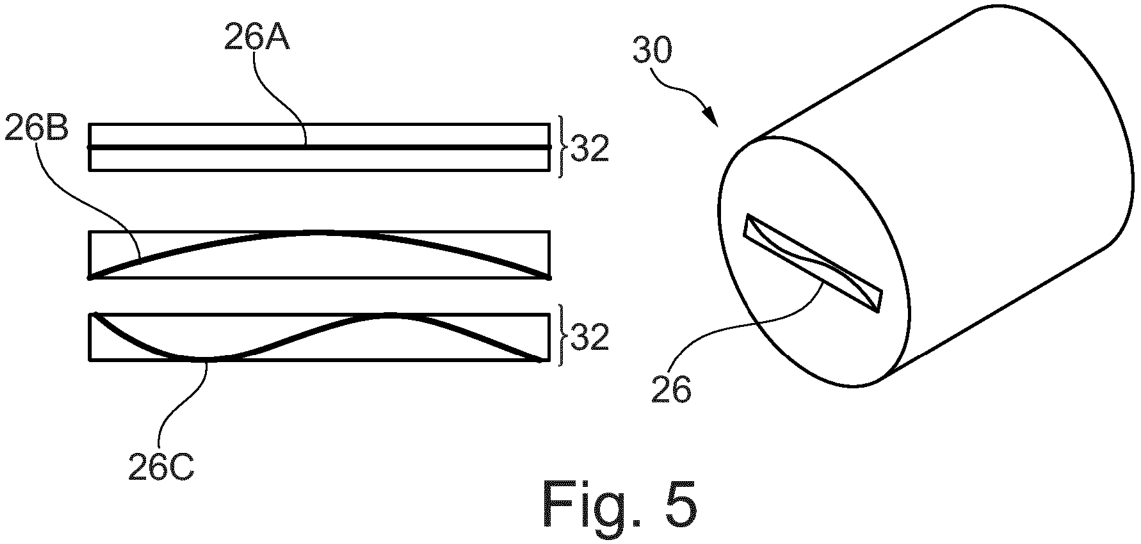
FIG. 5 shows a parameter range for the shape of the cross-section of the susceptor element within the intersection of the article.

FIG. 5 shows a reference range for the shape of a susceptor element. The left-hand part of FIG. 5 shows different shapes 26A to 26C of the cross-section of a susceptor element. The shape 26A of the cross-section of the susceptor element fully complies with the acceptable reference range 32 and is located in the center of this reference range. In contrast to that, the shapes 26B and 26C include one bend and two bends of the susceptor, respectively.

Nevertheless, both shapes 26B and 26C are still within the acceptable reference range 32 as shown on the left-hand side of FIG. 5. In particular, the acceptable reference range 32 may allow bending of the plane of the cross-section of the susceptor element of ±0.9 millimeters with regard to the plane of the fully compliant susceptor element with the shape 26A. The right-hand part of FIG. 5 shows the intersection 30 with the cross-section 26 of the susceptor element.

Figure 6:
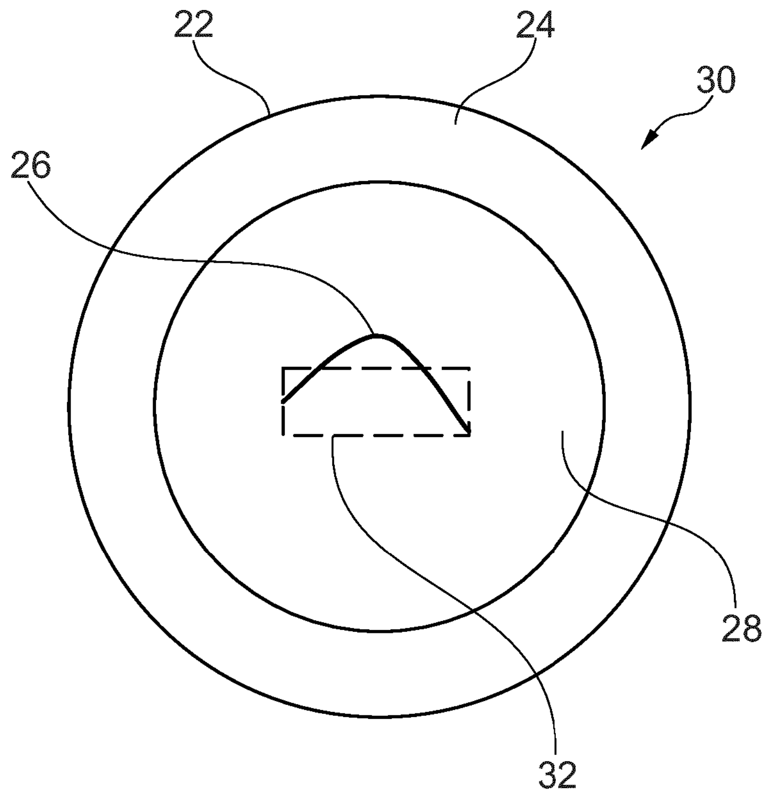
FIG. 6 shows the comparison of a reference positioning range and the reference shape range with an actual determined position and shape of a cross-section of a susceptor element.

FIG. 6 depicts a comparison of the reference positioning range 28 and the reference shape range indicated by the dashed line 32 with a cross-section 26 of a susceptor element within an intersection 30 of an aerosol-generating article. It can be seen that the cross-section 26 of the susceptor element is fully located within the reference positioning range 28. Thus, the actually determined cross-section 26 of the susceptor element is able to pass the evaluation concerning the positioning of the susceptor element. However, as indicated by the dashed box 32, the heavily bent cross-section 26 of the susceptor element is partly located outside of the acceptable reference range 32 for the shape of the susceptor element. Consequently, this aerosol-generating article does not pass the evaluation test concerning the acceptable shape of the susceptor element within the intersection 30.

Figure 7:
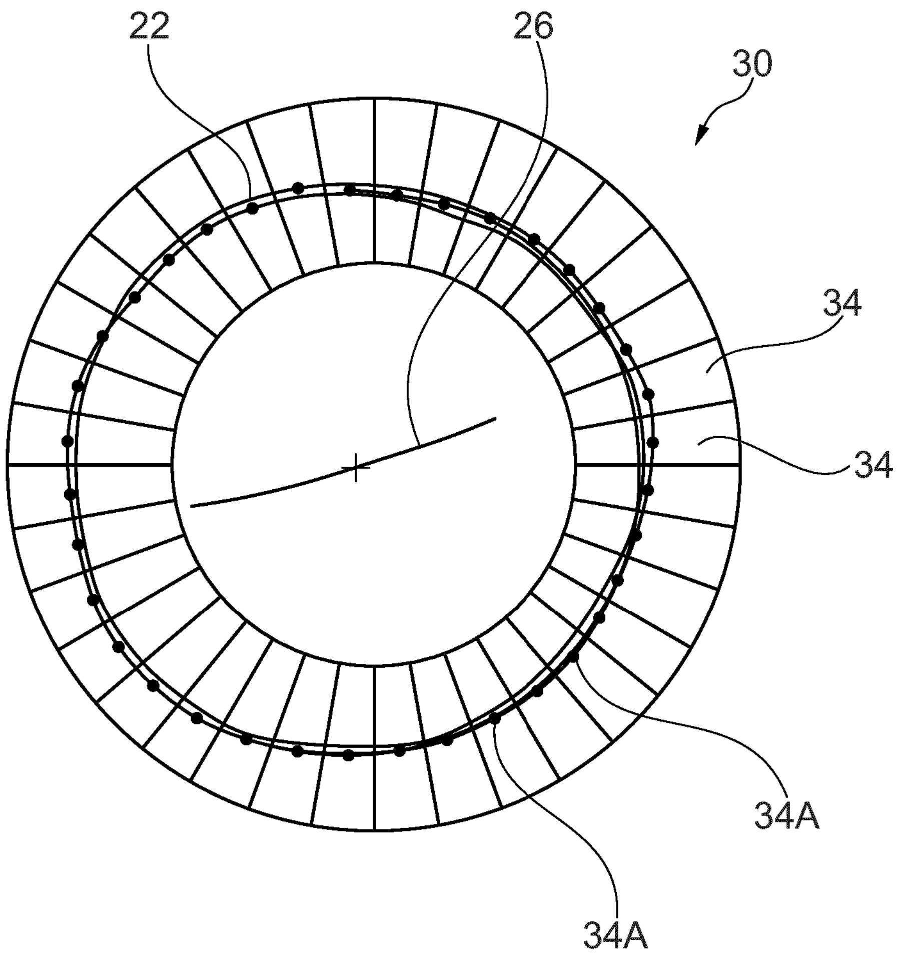
FIG. 7 shows one example of an approximation procedure for obtaining the outer circumference of an aerosol-generating article by dividing a visual image into segments.

FIG. 7 shows one example of an image processing by approximation. A visual image of an intersection 30 of an aerosol-generating article is shown with an outer circumference 22 of the aerosol-generating article made of wrapping paper. In this example, the approximated outer circumference of the article is determined by dividing the visual image into segments 34. Each segment is then scanned from the periphery of the image to the center of the visual image for changes in the brightness of the segment. Any changes in the brightness of the segment may indicate a boundary of an object, in the present case the outer circumference of the aerosol-generating article. For each segment 34 where such a rapid change in the brightness can be detected, one image point 34A is generated at the position of the brightness change. An approximated circumference of the outer circumference 22 of the aerosol-generating article is then generated via fitting a curve through these various image points 34A for example by a least-squares method.

The invention claimed is:

1. A method for evaluating an aerosol-generating article with a susceptor element for manufacturing defects, comprising:

providing an aerosol-generating article with a substrate section, the substrate section comprising an aerosol-forming substrate and a susceptor element, providing an intersection through the substrate section and the susceptor element, and evaluating the intersection for manufacturing defects by determining one or more of:

positioning of the susceptor element in the substrate section, length of the cross section of the susceptor element, and shape of the cross section of the susceptor element, wherein a visual image of the intersection is recorded and wherein the image is evaluated for the manufacturing defects, wherein the visual image is divided into a plurality of segments and wherein a circumference of the cross section of the susceptor element is approximated by analyzing the segments in the visual image, thereby creating an approximated circumference of the cross section of the susceptor element.

2. The method according to claim 1, wherein a camera system is employed for recording the visual image of the intersection.

3. The method according to claim 1, wherein brightness changes are detected in the segments, thereby creating datapoints for the circumference of the cross section of the susceptor element, wherein the datapoints are employed to reconstruct the cross section of the susceptor element.

4. The method according to claim 1, wherein an approximated circumference in the substrate section is determined and compared to a reference range, thereby obtaining a first evaluation result.

5. The method according to claim 4, wherein the reference range comprises one or more of: a reference positioning of the cross section of the susceptor element within the aerosol-generating article, a reference shape of the cross section of the susceptor element, and a reference length of the cross section of the susceptor element and wherein one or more of the following method steps are preformed:

comparing the reference positioning of the cross section of the susceptor element within the aerosol-generating article with the positioning of the approximated circumference of the cross section of the susceptor element, thereby obtaining a first positioning evaluation result, comparing the reference shape of the cross section of the susceptor element with the shape of the approximated circumference of the cross section of the susceptor element, thereby obtaining a first shape evaluation result, and comparing the reference length of the cross section of the susceptor element with the length of the approximated circumference of the cross section of the susceptor element, thereby obtaining a first length evaluation result.

6. The method according to claim 4, wherein the first evaluation result is obtained during manufacturing of the aerosol-generating article.

7. The method according to claim 5, wherein a refined circumference in the substrate section is compared to the reference range, thereby obtaining a second evaluation result.

8. The method according to claim 4, wherein the first evaluation result is obtained during manufacturing of the aerosol-generating article, wherein a production device is used for manufacturing of the aerosol-generating article and wherein said production device is employed for obtaining the first evaluation result.

9. The method according to claim 7, wherein the second evaluation result is obtained by employing a computer system.

10. The method according to claim 7, wherein the substrate section is covered with a wrapping paper and wherein:

the first evaluation result is obtained by determining a distance between the wrapping paper and the approximated circumference, or the second evaluation result is obtained by determining a distance between the wrapping paper and the refined circumference.

11. The method according to claim 7, wherein the second evaluation result is employed for correcting the first evaluation result.

12. The method according to claim 11, wherein the substrate section is covered with a wrapping paper and wherein:

the first evaluation result is obtained by determining a distance between the wrapping paper and the approximated circumference, or the second evaluation result is obtained by determining a distance between the wrapping paper and the refined circumference.

13. The method according to claim 7, wherein an aerosol-generating article is rejected if:

any part of the approximated circumference deviates from the reference positioning by more than 10 percent, or any part of the refined circumference deviates from the reference positioning by more than 10 percent.

14. The method according to claim 7, wherein the second evaluation result is employed for correcting the first evaluation result.

15. The method according to claim 7, wherein the second evaluation result is obtained by employing a computer system, wherein the computer system is separate from the production device for manufacturing the aerosol-generating article.

16. The method according to claim 5, wherein the circumference of the cross section of the susceptor element is determined by analyzing at least 70 percent of the image points of the visual image by fitting a cross sectional shape through the image points, thereby creating a refined circumference of the cross section of the susceptor element.

17. The method according to claim 16, wherein an aerosol-generating article is rejected if:

any part of the approximated circumference deviates from the reference positioning by more than 10 percent, or any part of the refined circumference deviates from the reference positioning by more than 10 percent.

18. The method according to claim 1, wherein the approximated circumference of the cross section of the susceptor element is determined by analyzing all the image points of the visual image by fitting a cross sectional shape through the image points, thereby creating a refined circumference of the cross section of the susceptor element.

19. The method according to claim 1, wherein brightness changes are detected in the segments, thereby creating datapoints for the approximated circumference of the cross section of the susceptor element, wherein the datapoints are employed to reconstruct the cross section of the susceptor element, wherein the cross section of the susceptor element is reconstructed by fitting a cross sectional shape through the datapoints of the segments.

* * * * *